United States Patent [19]
Heath et al.

[11] Patent Number: 5,347,070
[45] Date of Patent: Sep. 13, 1994

[54] TREATING OF SOLID EARTHEN MATERIAL AND A METHOD FOR MEASURING MOISTURE CONTENT AND RESISTIVITY OF SOLID EARTHEN MATERIAL

[75] Inventors: William Heath; Richard Richardson; Steven Goheen, all of Richland, Wash.

[73] Assignee: Battelle Pacific Northwest Labs, Richland, Wash.

[21] Appl. No.: 792,213

[22] Filed: Nov. 13, 1991

[51] Int. Cl.$^5$ .............................................. E02D 3/00
[52] U.S. Cl. ................................. 588/253; 405/128; 405/131; 588/249
[58] Field of Search ............... 405/128, 129, 131, 258, 405/303; 166/248; 588/253; 219/10.81

[56] References Cited

U.S. PATENT DOCUMENTS

| | | | |
|---|---|---|---|
| B1 4,376,598 | 10/1989 | Brouns et al. | 405/258 |
| 2,795,279 | 6/1957 | Sarapuu . | |
| 3,169,577 | 2/1965 | Sarapuu . | |
| 3,972,372 | 8/1976 | Fisher et al. | 166/248 |
| 4,196,329 | 4/1980 | Rowland et al. | 219/10.81 |
| 4,376,598 | 3/1983 | Brouns et al. | 405/258 |
| 4,457,365 | 7/1984 | Kasevich et al. | 166/60 |
| 4,670,634 | 6/1987 | Bridges et al. | 219/10.41 |
| 4,957,393 | 9/1990 | Buelt et al. | 405/128 |
| 4,973,811 | 11/1990 | Bass | 219/10.57 |
| 5,004,373 | 1/1991 | Carter | 405/131 |
| 5,011,329 | 4/1991 | Nelson et al. | 405/128 |
| 5,024,556 | 6/1991 | Timmerman | 405/128 |
| 5,032,042 | 6/1991 | Schuring et al. | 405/258 |
| 5,100,259 | 3/1992 | Buelt et al. | 405/131 X |
| 5,152,341 | 10/1992 | Kasevich | 405/128 X |

Primary Examiner—Dennis L. Taylor
Attorney, Agent, or Firm—Wells, St. John, Roberts, Gregory & Matkin

[57] ABSTRACT

The present invention includes a method of treating solid earthen material having volatile, semi-volatile and non-volatile contaminants. Six electrodes are inserted into a region of earthen material to be treated in a substantially equilateral hexagonal arrangement. Six phases of voltages are applied to corresponding electrodes. The voltages are adjusted within a first range of voltages to create multiple current paths between pairs of the electrodes. The current paths are evenly distributed throughout the region defined by the electrodes and therefore uniformly heat the region. The region of earthen material is heated to a temperature sufficient to substantially remove volatile and semi-volatile contaminants. This temperature is less than a melting temperature of the earthen material. The voltages are then increased to a second range of voltages effective to create dry regions around the electrodes. The dry regions have a perimeter which define a boundary between the dry regions and the earthen material exterior to the dry regions. Corona discharge occurs at the boundaries of the dry regions. As voltages are increased further, the dry regions move radially outward from the electrodes through the entire region. The corona boundaries decompose the non-volatilized contaminants remaining in the region. The hexagonal arrangement of electrodes is also preferable for measuring resistivity and moisture content of the earthen material. The electric field created between the electrodes is readily discernable and therefore facilitates accurate measurements.

56 Claims, 8 Drawing Sheets

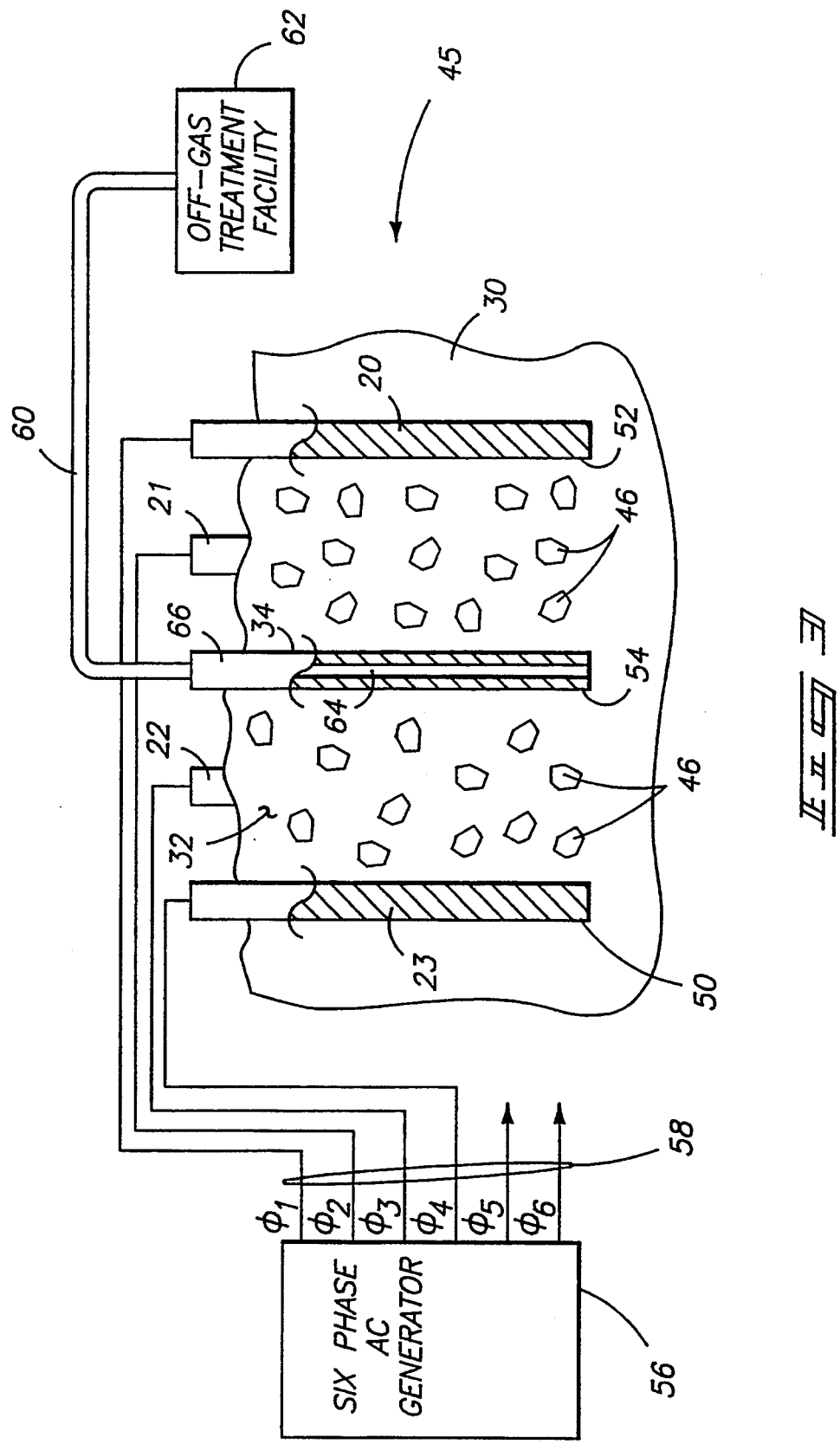

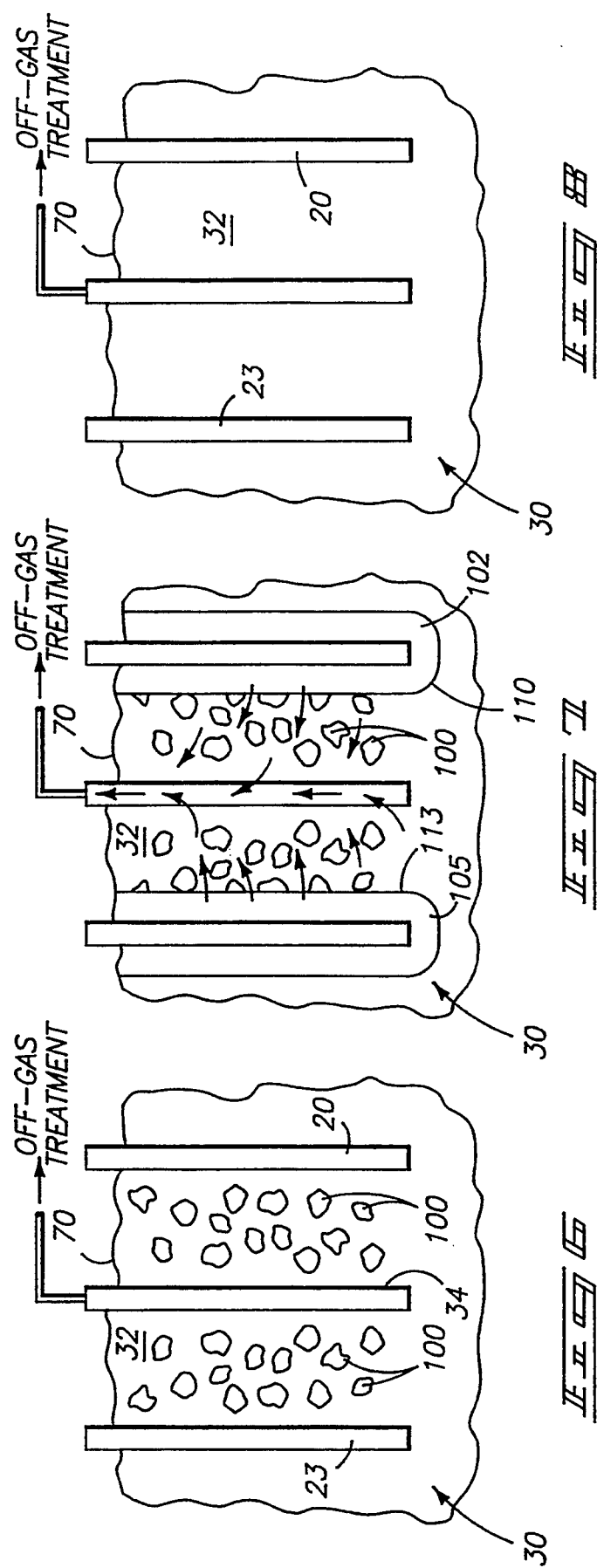

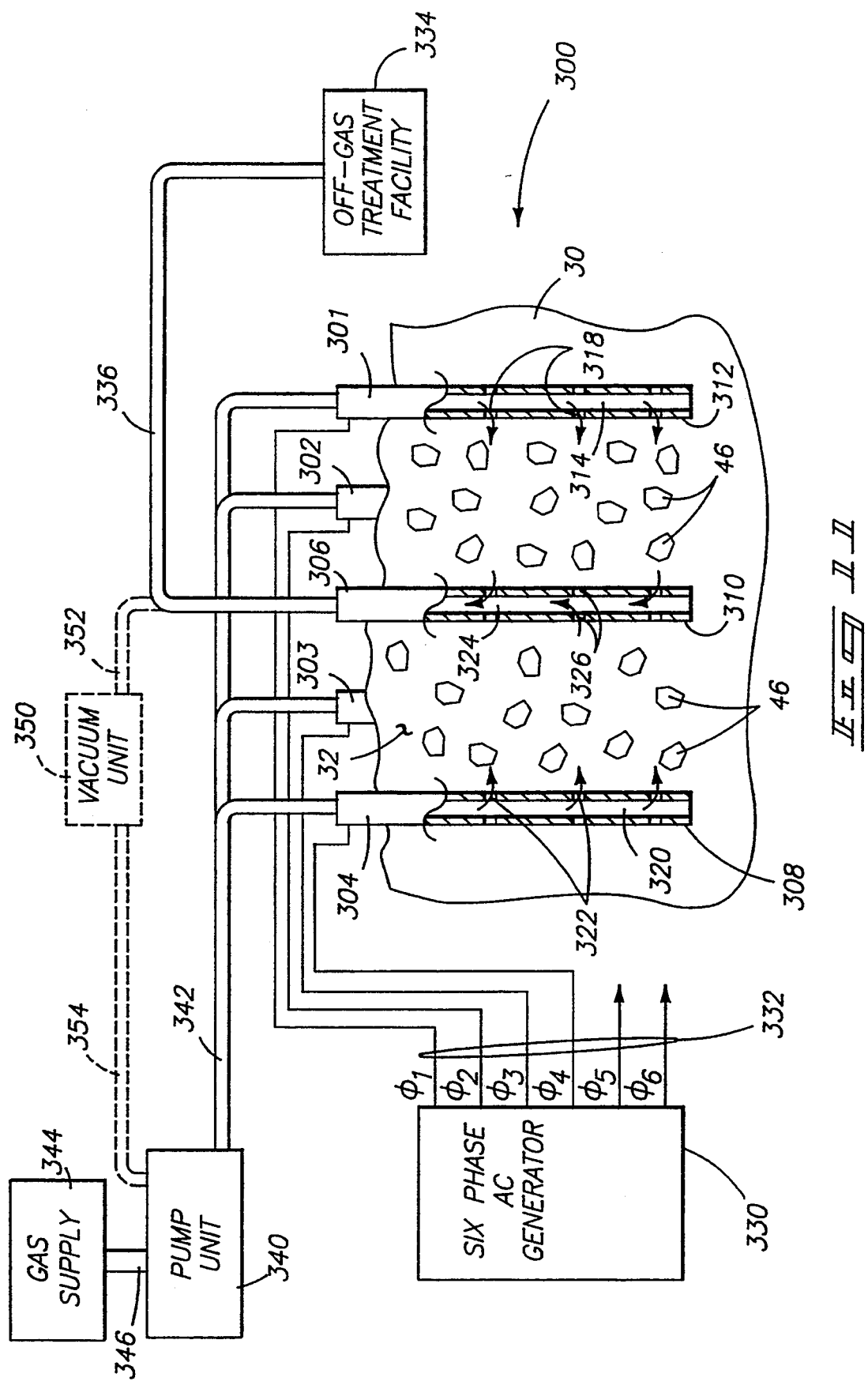

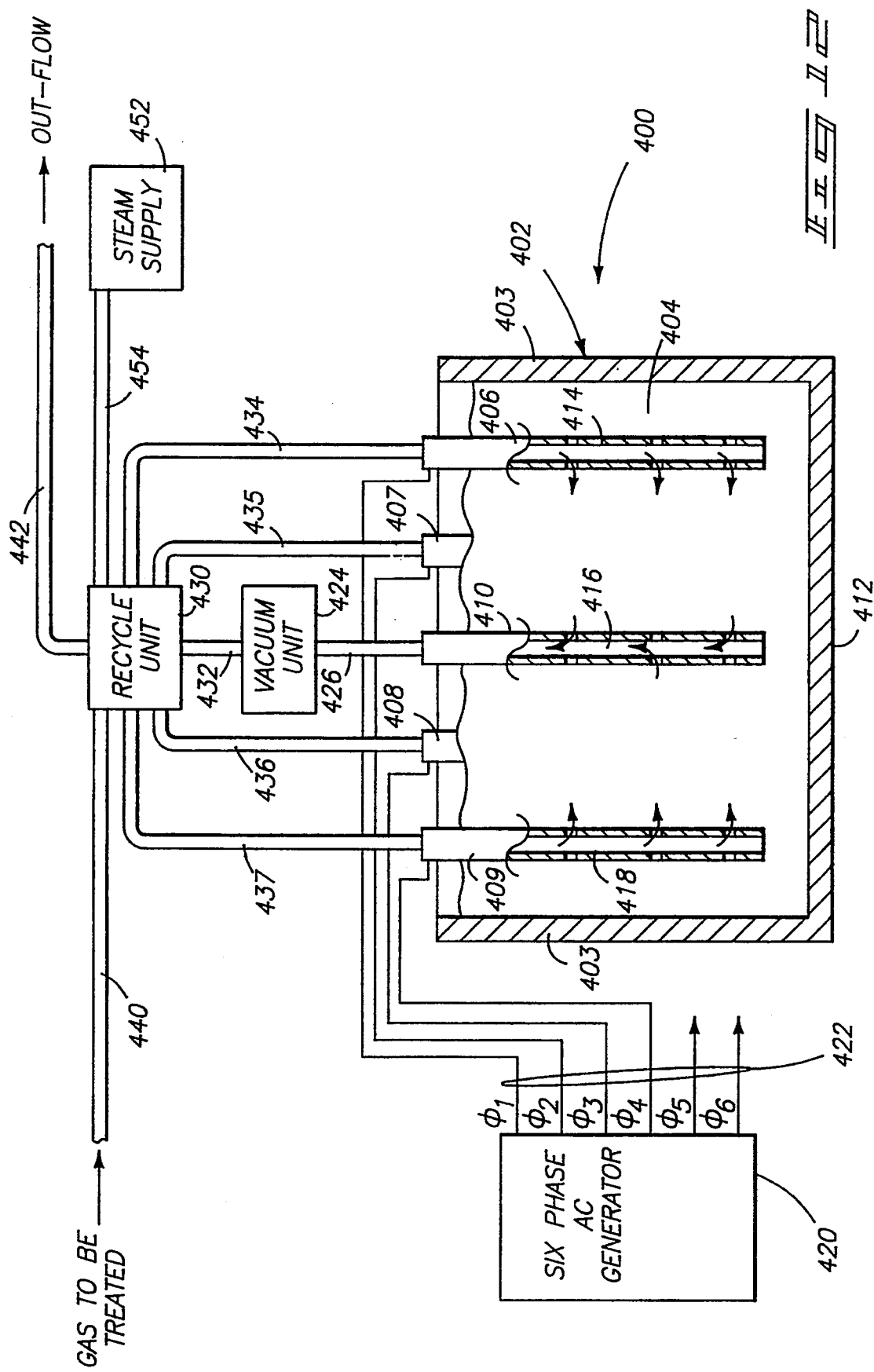

5,347,070

TREATING OF SOLID EARTHEN MATERIAL AND A METHOD FOR MEASURING MOISTURE CONTENT AND RESISTIVITY OF SOLID EARTHEN MATERIAL

TECHNICAL FIELD

This invention relates to a method for treating solid earthen material. This invention also relates to a method for measuring moisture content and resistivity of solid earthen material.

BACKGROUND OF THE INVENTION

This invention was made with government support under contract number DE-AC06-76RLO 1830, awarded by the U.S. Department of Energy. The government has certain rights in the invention.

The disposal of contaminated material has become an increasingly significant problem. Today, contaminated material, such as industrial and nuclear waste, is buried underground in specially designed storage containers. These contaminants buried in the ground typically contain volatile, semi-volatile, and non-volatile organic contaminants. Unfortunately, burying the contaminants does not render them unharmful to the environment. The storage containers can leak the contaminants into the soil, thereby polluting the soil. The contaminates may also pass into underground water tables and contaminate the water supply for populated regions. Ground contaminates can also result from surface spills that seep into the soil.

One approach to detoxifying organic-contaminated soils was proposed by Buelt et al. in U.S. Pat. No. 4,957,393, assigned to Battelle Memorial Institute. Buelt et al. proposed inserting a matrix of electrodes into a contaminated soil region and applying very high DC voltage or single phase AC voltage to the electrodes. The voltages created current paths between the electrodes which effectively heated the contaminated soil to temperatures ranging from 100° C. to 1200° C.

The present invention arose out of a need to provide a more energy efficient and less costly system for treating contaminated soils. The present invention provides a method for treating contaminated soil which enables uniform heating of the soil at relatively low energy costs.

BRIEF DESCRIPTION OF THE DRAWINGS

Preferred embodiments of the invention are described below with reference to the following accompanying drawings.

FIG. 3 is a diagrammatical illustration of a system for treating solid earthen material in accordance with an aspect of the present invention. FIG. 3 also illustrates one embodiment for venting contaminants from solid earthen material.

FIG. 4 is a top plan view illustrating an arrangement of twelve electrodes in accordance with another aspect of the present inventions.

FIG. 5 is a top plan view illustrating an arrangement of twelve electrodes in accordance with yet another aspect of the prevent invention.

FIG. 6 diagrammatically illustrates an initial step to chemically altering contaminants disposed in solid earthen material.

FIG. 7 diagrammatically illustrates a formation and expansion of a dry region formed at a time subsequent to the step shown by FIG. 6.

FIG. 8 diagrammatically illustrates a region of earthen material at a time subsequent to the step shown by FIG. 7.

FIG. 11 also illustrates recycling off-gas into a region of solid earthen material for further treatment.

FIG. 12 is a diagrammatical illustration of an apparatus for treating off-gas in accordance with another aspect of the present invention.

FIG. 13 diagrammatically illustrates a process for forming vitrescent soil fragments in accordance with another aspect of the present invention.

DETAILED DESCRIPTION OF THE PREFERRED EMBODIMENTS

Figure 1:
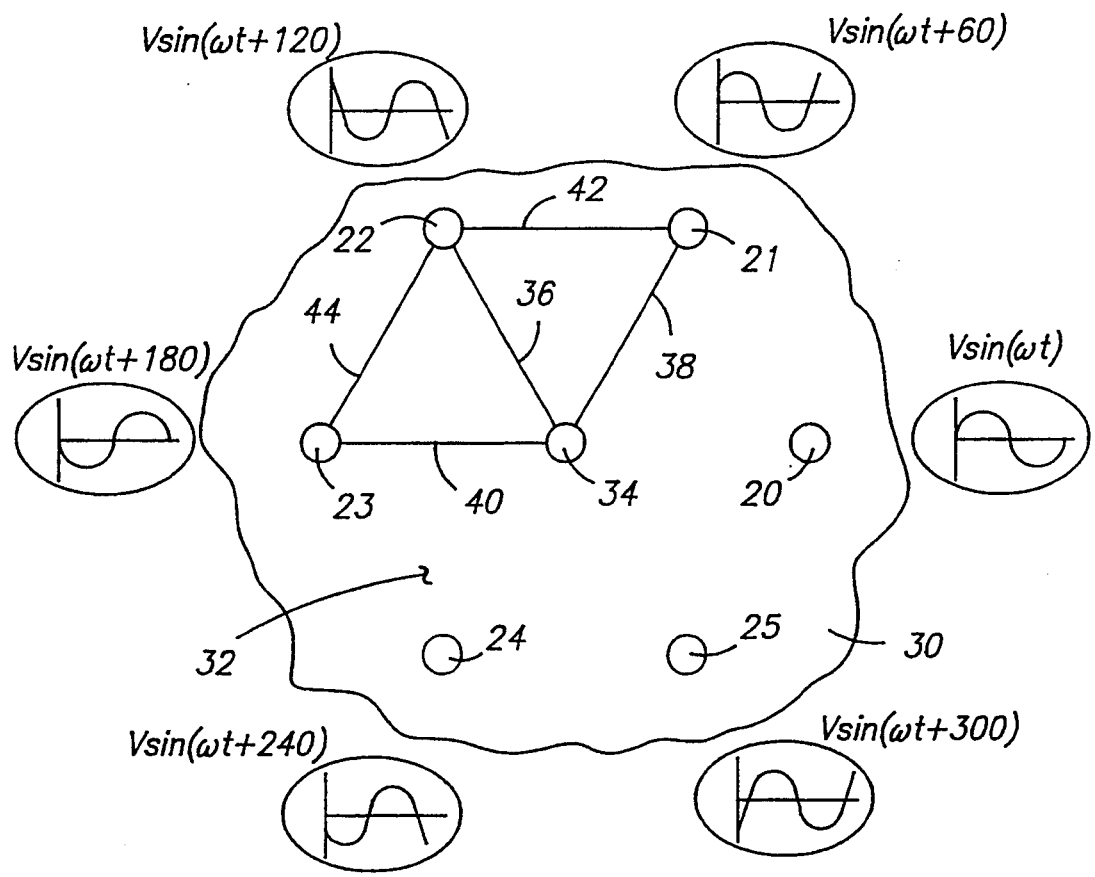
FIG. 1 is a top plan view of a hexagonal electrode arrangement capable of supporting six phases of voltages in accordance with an aspect of the present invention.

This disclosure of the invention is submitted in furtherance of the constitutional purposes of the U.S. Patent Laws "to promote the progress of science and useful arts" (Article 1, Section 8).

According to one aspect of the present invention, a method of treating solid earthen material comprises the steps of:
  inserting a plurality of electrodes into a region of solid earthen material to be treated; and
  applying at least six phases of voltages to corresponding ones of the electrodes to create current paths between pairs of the electrodes and through the region of material.

"Solid earthen material" as used in this disclosure means fragmental material composing part of the surface of the globe. The term "solid earthen material" includes fine, densely packed particles having moisture interspersed between the particles; ground; dirt; sand; soil; sludge; slurry; mud; shale; in situ material and material which has been extracted and removed from their native location; etc.

The above method may further comprise:
  arranging the plurality of electrodes in a geometric configuration having diametrically opposing pairs of electrodes, the pairs defining opposing first and second electrodes; and
  applying first and second phases of voltages to the respective first and second electrodes of respective pairs of electrodes, the first and second phases of voltages having voltage amplitudes which are substantially equal, the first and second phases being approximately 180° out of phase with respect to one another.

The six electrodes can be positioned in the solid earthen material and the six phases of voltages applied to the electrodes in a manner effective to produce a substantially constant voltage-to-distance ratio for all current paths between electrode pairs. The voltage-to-distance ratio for a given pair of electrodes is computed by dividing the voltage measured between the given pair of electrodes by the distance between the given pair of electrodes.

According to another aspect of the present invention, a method of treating solid earthen material comprises of the steps of:
 inserting a plurality of electrodes into a region of solid earthen material to be treated;
 applying at least six phases of voltages to corresponding ones the electrodes to create current paths between pairs of the electrodes and through the region of material; and
 heating the region of material to a temperature below a melting temperature of the solid earthen material, with a temperature ranging from approximately 0° C. to 100° C. being preferred.

According to another aspect of the present invention, a method of treating solid earthen material comprises the steps of:
 inserting a plurality of peripheral electrodes into solid earthen material, the peripheral electrodes being arranged in a selected geometric perimeter which defines an internal region of material to be treated;
 inserting at least one electrically neutral electrode in the region of material to be treated; and
 applying multiple phases of voltages to corresponding ones of the peripheral electrodes to create current paths between (1) pairs of the peripheral electrodes, and (2) the peripheral electrodes and the neutral electrode, the current paths passing through and substantially uniformly heating the region of material.

The peripheral electrodes can be arranged at vertices of a substantially equilateral polygon having at least six sides. The neutral electrode would then preferably be positioned in a substantially diametric center of the region of material.

The neutral electrode may be formed with a passage therethrough which communicates with the solid earthen material and a location external to the solid earthen material. In this manner, gases from the region of material may be removed through the passage in the neutral electrode.

According to yet another aspect of the present invention, a method for treating solid earthen material comprises the steps of:
 inserting first, second, third, fourth, fifth, and sixth electrodes into solid earthen material;
 applying a first phase of voltage to the first electrode;
 applying a second phase of voltage to the second electrode;
 applying a third phase of voltage to the third electrode;
 applying a fourth phase of voltage to the fourth electrode;
 applying a fifth phase of voltage to the fifth electrode;
 applying a sixth phase of voltage to the sixth electrode; and
 the voltages applied to the first, second, third, fourth, fifth, and sixth electrodes being sufficient to create current paths between pairs of the electrodes through the material, the current paths heating the material.

The first through sixth electrodes can be arranged at vertices of a substantially equilateral hexagon.

According to another aspect of the present invention, a method for treating solid earthen material having volatile, semi-volatile, and non-volatile contaminants comprises the steps of:
 inserting multiple electrodes into solid earthen material;
 applying multiple phases of voltages to corresponding ones of the electrodes;
 adjusting the voltages within a first selected range of voltages to heat the material to a temperature sufficient to substantially remove volatile and semi-volatile contaminates from the material; and
 increasing the voltages through a second selected range of voltages effective to create a corona front which decomposes the non-volatile contaminates.

The first selected range of voltages is preferably less than the second selected range of voltages. Moreover, the temperature sufficient to substantially remove volatile and semi-volatile contaminants is less than a melting temperature of the solid earthen material.

According to yet another aspect of the present invention, a method for treating solid earthen material having volatile, semi-volatile, and non-volatile contaminants comprises the steps of:
 inserting multiple electrodes into solid earthen material, the electrodes defining a region of material to be treated;
 applying multiple phases of voltages to corresponding ones of the electrodes;
 adjusting the voltages within a first selected range of voltages to heat the material to a temperature sufficient to substantially remove volatile and semi-volatile contaminates from the region of material;
 creating dry regions of material around individual electrodes as the material is heated, the dry regions having a periphery which defines a boundary between the dry regions of material and earthen material exterior to the dry regions;
 increasing the voltages to a second range of voltages to create a corona at the boundary between the dry regions of material and earthen material exterior to the dry regions;
 moving the boundary of the dry regions radially outward from the individual electrodes through the region of material, the corona being moved with the boundary of the dry regions; and
 decomposing the non-volatile contaminates as the corona carrying boundary passes over the non-volatile contaminates.

Various aspects of the invention are more fully described by reference to the accompanying figures. Specifically, FIG. 1 illustrates an electrode arrangement and voltage configuration suitable for treating solid earthen material in accordance with the present invention. Six electrodes 20–25 are inserted into a solid earthen material 30 to be treated. Electrodes 20–25 may be formed of aluminum, carbon steel, or any other type of conductive material. Electrodes 20–25 are preferably cylindrical and can be hollow or solid.

Six phases of AC voltages are applied to corresponding electrodes 20–25. Preferably, each electrode has a voltage phase which is 60° out of phase with the voltages of adjacent electrodes. For instance, electrode 20 has a voltage phase 60° apart from the voltage phase applied to electrode 21. To further illustrate the different phases of voltages applied to electrodes 20–25, exemplary waveforms of different phases are shown adjacent respective electrodes 20–25. Electrode 20 has a voltage Vsin(ωt); electrode 21 has a voltage Vsin(ωt+60); electrode 22 has a voltage Vsin(ωt+120); electrode 23 has a voltage Vsin(ωt+180); electrode 24 has a voltage Vsin(ωt+240); and electrode 25 has a voltage Vsin(ωt+300).

Electrode 20–25 are preferably arranged in a geometric configuration in which pairs of electrodes are diametrically opposite one another. Electrodes 20, 21, and 22 are diametrically opposite electrode 23, 24, and 25, respectively. Electrodes 20–25 are most preferably positioned at vertices of a substantially equilateral hexagon, as shown.

The voltages applied to diametrically opposing pairs of electrodes preferably have voltage amplitudes which are substantially equal, as indicated by the voltage amplitude V. Additionally, the voltages applied to diametrically opposing electrodes are preferably approximately 180° out of phase with respect to one another. For example, the voltage applied to electrode 20 is 180° out of phase with the voltage applied to electrode 23. Similarly, the voltage applied to electrode 21 is approximately 180° out of phase with the voltage applied to electrode 24.

The six phases of voltages applied to electrodes 20–25 may be applied at any frequency. The voltages are preferably applied at power frequencies less than 500 Hz, and most preferably, at a frequency of approximately 60 Hz. In this manner, power voltages carried by standard transmission lines may be used to drive the six phases of voltages applied to electrodes 20–25. Using a 60 Hz, six phase voltage provides a significant advantage in that the current supplied to electrodes 20–25 is in phase with the driving voltages from power lines. This results in a significant reduction in transformer losses.

Another aspect of the present invention includes positioning an electrically neutral electrode 34 centrally in a region 32 of solid earthen material 30. Region 32 is internal to a perimeter defined by electrodes 20–25. Neutral electrode 34 is preferably positioned in a substantially diametric center of the hexagon formed by electrodes 20–25. When the multiple phases of voltages (preferably, six phases) are applied to electrodes 20–25, current paths between peripheral electrodes 20–25 and neutral electrode 34 are created, as represented by current paths 36, 38, and 40. Additionally, current paths are created between pairs of peripheral electrodes 20–25, as represented by current path 42 between a pair of electrodes 21 and 22 and current path 44 between a pair of peripheral electrodes 22 and 23.

The current paths created between pairs of peripheral electrodes 20–25 (i.e., current paths 42 and 44) and between peripheral electrodes 20–25 and neutral electrode 34 (i.e., current paths 36, 38, and 40) pass through and substantially uniformly heat region 32 of solid earthen material 30. Region 32 is preferably heated to a temperature below a melting temperature of solid earthen material 30. Most preferably, region 32 is heated to a temperature ranging from approximately 0° C. to 100° C.

With the hexagonal arrangement, multiple phases of voltages can be applied to peripheral electrodes 20–25 in a manner effective to produce a substantially constant voltage-to-distance ratio for all current paths between peripheral electrodes 20–25 (i.e., current paths 42 and 44) and between peripheral electrodes 20–25 and neutral electrode 34 (i.e., current paths 36, 38, and 40). The voltage-to-distance ratio between any given pair of electrodes (for example, current path 44 between a pair of peripheral electrodes 22 and 23, or current path 38 between a pair of peripheral electrodes 21 and neutral electrode 34) is computed by dividing the voltage measured between the given pair of electrodes and the distance by the given pair of electrodes.

Figure 2:
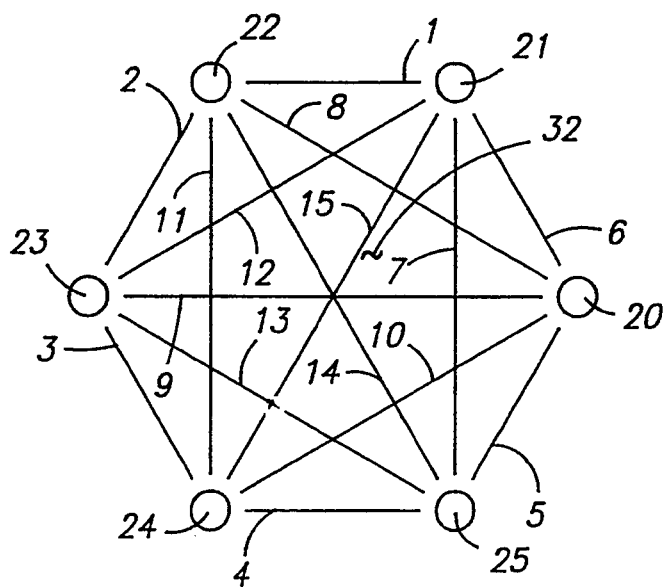
FIG. 2 illustrates a formation of current paths created between six electrodes which are hexagonally arrayed.
Figure 9:
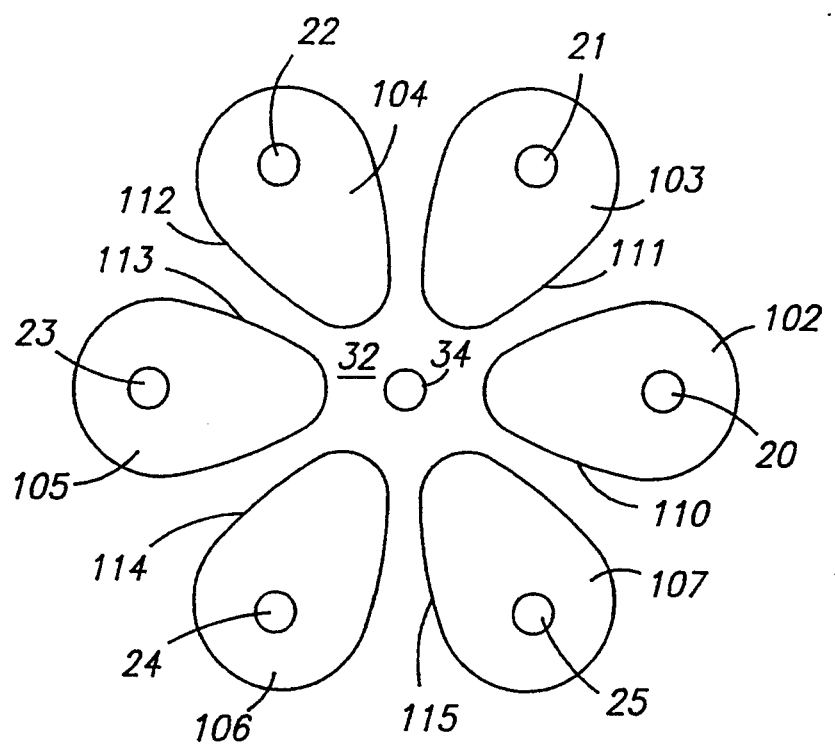
FIG. 9 is a top plan view of the electrodes illustrating the formation of dry regions in accordance with an aspect of the present invention.

FIG. 2 shows an alternative current path formation created between pairs of electrodes 20–25 when neutral electrode 34 is removed from region 32. Fifteen current paths 1–15 are formed through region 32 when six phases of voltages are applied to electrodes 20–25. Preferably, a current path is formed between each electrode and every other electrode in the hexagon. Current paths 1–15 are substantially evenly distributed throughout region 32, resulting in a substantially uniform heating of region 32. The number of current paths created between pairs of electrodes depends upon the number of phases of voltages applied to the electrodes. The following equation defines a minimum number of current paths between pairs of electrodes:

No. of current paths = $[Qn(Qn-1)]/2$ where Qn equals the total number of applied phases of voltages. In the preferred embodiment, six phases of voltages are applied to electrodes 20–25. Using the above equation, applying six phases of voltages results in a minimum number of fifteen current paths (i.e., $[6(6-1)]/2=15$).

Arranging six electrodes at vertices of a substantially equilateral hexagon and applying six phases of voltages to the corresponding electrodes has several significant advantages. First, current paths created between electrodes 20–25 substantially uniformly heat region 32 during the treatment of solid earthen material 30. Uniform heating is achieved without the addition of foreign conductive medium, such as salt water. Uniform heating assists in complete removal of volatile and semivolatile contaminants contained in solid earthen material 30.

Another significant advantage of the present invention is that relatively low voltages may be applied to the earthen material to effectuate appropriate heating. Due to the hexagonal arrangement, many of the current paths are in parallel. In FIG. 2, parallel current paths include paths 7 and 11; paths 8 and 13; paths 10 and 12; paths 1, 4, and 9; paths 3, 6, and 14; and paths 2, 5, and 15. As a result, the resistances of the paths are also in parallel. Parallel resistances reduce the total resistance of earthen material within region 32. Because total resistance is decreased, the voltages applied to electrodes 20–25 may be reduced. This results in a significant reduction of equipment and power costs for treating solid earthen material 30.

Another advantage of the above described aspect of the invention is that the current supplied to the electrodes is in phase with the power supplied to the treatment site by utility companies. Unity power factor (wherein power factor is the cosine of the phase angle between voltage and current) is therefore achieved. Unity power factor is the most efficient use of power.

FIG. 3 is a diagrammatical illustration showing a system 45 for treating earthen material in accordance with the present invention. Electrodes 20–25 are inserted into region 32 of solid earthen material 30 to be treated in an arrangement described above with reference to FIG. 1. Only four peripheral electrodes 20, 21, 22, and 23 and neutral electrode 34 are shown for purposes of clarity. Peripheral electrodes 20–23 and neutral electrode 34 are inserted into solid earthen material 30 in a substantially parallel relation. Electrodes 21–23 and 34 are inserted to a depth sufficient to ensure that most contaminants 46 lie within region 32 and above distal ends of electrodes 20–25, as represented by distal ends 50, 52, and 54.

System 45 includes a six phase AC generator 56 and an off-gas treatment facility 62. Six phase AC generator 56 is coupled peripheral electrodes 20–25. Six conductors 58 electrically connect generator 56 to respective peripheral electrodes 20–25. A different phase of voltage is applied to individual conductors 58. A voltage having phase $\Phi_1$ is applied to electrode 20. A voltage having phase $\Phi_2$ is applied to electrode 21. Similarly, voltages having phases $\Phi_3$–$\Phi_6$ are applied to corresponding electrodes 22–25. As discussed above, phases $\Phi_1$–$\Phi_6$ are preferably 60° apart from each other.

Off-gas treatment facility 62 is connected in fluid communication to neutral electrode 34 through a conduit 60. Neutral electrode 34 is preferably formed with a hollow passage 64 extending axially therethrough. Passage 64 communicates with solid earthen material 30 and a location external to solid earthen material 30 at end 66 of neutral electrode 34. Neutral electrode 34 can be perforated to facilitate fluid communication between passage 64 and solid earthen material 30. As the voltages are applied to electrodes 20–25 to heat region 32, volatile and semi-volatile contaminants are removed from solid earthen material 30 via passage 64. The contaminants are pulled through conduit 60 to off-gas treatment facility 62. Preferably, off-gas treatment facility 62 has a vacuum to draw the contaminants from solid earthen material 30 through neutral electrode 34 and conduit 60. An advantage to employing an electrically neutral electrode 34 is that conduit 60 to off-gas treatment facility 62 may be connected to electrode 34 without any threat of being electrically shocked. Off-gas treatment facility 62 chemically treats the volatile and semi-volatile contaminants to render the contaminants unharmful. Alternately, the gases can be processed for commercial purposes.

Figure 10:
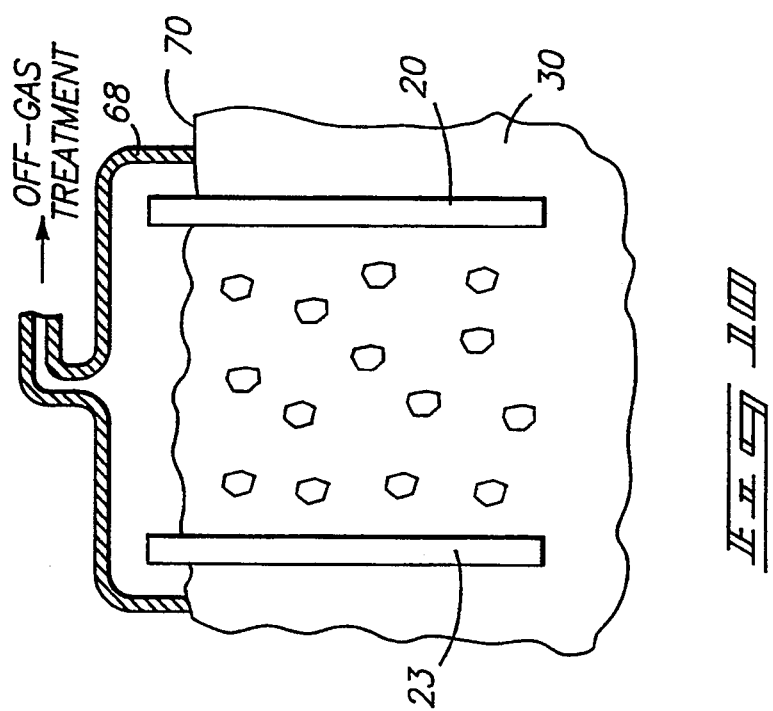
FIG. 10 diagrammatically illustrates an alternative embodiment for venting contaminants from solid earthen material.

FIG. 10 shows an alternative embodiment for venting or removing volatile and semi-volatile contaminants from solid earthen material 30 during the heating process. An off-gas hood 68 is positioned over and encircling electrodes 20–25. Off-gas hood 68 contacts a surface 70 of solid earthen material 30 to minimize the escape of contaminants into the atmosphere. Off-gas hood 68 collects gases during the heating process and transfers the gases to an off-gas treatment facility. Again, the off-gas treatment facility advantageously has a vacuum system to facilitate removal of the gases. In this embodiment, a neutral electrode vent is not utilized and is thus omitted from the figure.

FIGS. 4 and 5 demonstrate alternative electrode arrangements employing more than six electrodes in accordance with an aspect of the present invention. FIG. 4 shows twelve peripheral electrodes 70–81 are arranged in a star-like shaped polygon. Preferably, the polygon defined by electrodes 70–81 is substantially equilateral, as is shown. FIG. 5 shows twelve electrodes 84–95 arranged at vertices of an equilateral polygon having twelve sides. The vertices also lie in a circumference of a circle.

Other numbers of electrodes may be employed instead of six or twelve electrodes. Additionally, the present invention is described as using six phase AC voltages, although other multiple phases of voltages may be employed with the six or more electrode arrangement.

FIGS. 6–9 diagrammatically demonstrate a method for treating solid earthen material according to an aspect of the present invention. Solid earthen material 30 has volatile, semi-volatile, and non-volatile contaminants provided therein. The non-volatile contaminants are referenced generally by numeral 100. Multiple electrodes are inserted into solid earthen material 30. Preferably, six peripheral electrodes and one neutral electrode are positioned in an arrangement shown in FIG. 1, but only electrodes 20 and 23 are shown for explanatory purposes. Multiple phases of voltages are applied to the electrodes, and preferably in a manner described above with reference to FIGS. 1–2. Neutral electrode 34 is connected to an off-gas treatment facility as explained above with reference to FIG. 2.

Multiple phases of voltages are applied to peripheral electrodes 20–25 to begin heating earthen material 30 (FIG. 6). The appropriate voltage level depends upon many factors including the mineral type and moisture content of earthen material 30, the diameter of electrodes 20–25, the distance between electrodes 20–25, and the length of the electrodes. Voltages increase with increasing distance between electrodes 20–25. Additionally, voltages decrease with increasing water content, electrode diameter, and electrode length. The voltages are adjusted within a first range of voltages to heat solid earthen material 30 to a temperature sufficient to substantially remove volatile and semi-volatile contaminants from the material. A typical starting voltage for a field-scale operation is approximately 1000 to 2000 VAC. Typical power input earthen material 30 is approximately 1000 W/m$^3$.

An advantage to the six electrode arrangement and application of multiple phases of voltages is that no foreign medium between electrodes is necessary to maintain conduction during all phases of drying. In many prior art methods, conductive material, such as salt water (brine) or NaOH, must be present in the region to maintain conduction during drying. However, salt water and NaOH are also contaminates. The present invention eliminates the necessity of adding a foreign contaminate simple to maintain conduction.

Solid earthen material 30 is heated at an approximately constant rate, such as 1° C. per hour. As the earthen material 30 heats, it becomes more conductive. The applied voltages are therefore lowered to maintain a constant rate of heating. Eventually, the voltages are reduced to approximately half of the starting value.

As earthen material 30 heats, the moisture contained in the material 30 begins to boil. Boiling first occurs around peripheral electrodes 20–25. Next, the moisture inward of the peripheral electrodes near neutral electrode 34 begins to boil. Additionally, some moisture outside of the perimeter defined by peripheral electrodes 20–25 will begin to boil. Moisture near surface 70 of earthen material 30 begins to boil before moisture near the distal ends of electrodes 20–25 farther beneath the surface. The moisture is last to boil near the bottom of electrodes 20–25 because the earthen material below the distal ends of electrodes 20–25 acts as a heat sink to remove heat from the bottom portion of region 32.

The boiling moisture or water forms steam which effectively strips volatile and semi-volatile organic compounds from earthen material 30. Some non-volatile organic contaminants will also be removed with the steam. The steam is removed through passage 64 provided in neutral electrode 34 and transferred to an off-gas treatment facility. Alternatively, the escaping steam can be captured by off-gas hood 68 as shown in FIG. 10.

As water and steam are removed from region 32, earthen material 30 begins to dry. The temperature of region 32 during this drying process is less than the melting temperature of solid earthen material 30. Earthen material 30 is not vitrified. Preferably, the temperature of region 32 is approximately 0° C. to 100° C.

The resistivity of solid earthen material 30 depends largely upon the moisture content thereof. As region 32 dries, resistivity increases. Therefore, the applied voltages are increased at some point to maintain an approximately constant heating rate. Yet, the power applied to earthen material 30 is preferably maintained at approximately the same level throughout the drying process.

When the moisture content falls below 10 wt % (and more specifically, between 4 and 7 wt %), voltages applied to the peripheral electrodes must be increased to a second range of voltages. The second range of voltages is greater than the first selected range of voltages. Preferably, the second range of voltages is approximately 2000 to 6000 VAC.

Dry regions 102–107 (FIGS. 7 and 9) begin to form around respective electrodes 20–25 as region 32 dries and the applied voltages are increased. Dry regions 102–107 have perimeters which define respective boundaries 110–115 between dry regions 102–107, respectively, and earthen material exterior to the dry regions. Boundaries 110–115 are wet-dry interfaces between dry regions 102–107 and "wet" regions exterior to the dry regions. Boundaries 110–115 are very narrow, and have a thickness of approximately less than one inch.

When the voltages are increased to the second ranges of voltages, a corona discharge is created at boundaries 110–115. A corona discharge provides an intense oxidizing environment which produces electrons, molecular ions, radicals, ion radicals, ozone, peroxides, and ultraviolet light. Corona can be used to oxidize many organic materials, such as town gas (a complex mixture consisting of benzene, toluene, benzo-A-pyrene (BAP), xylene, and naphthalene), trichloroethylene, and carbon tetrachloride. Corona also oxidizes metals, such as lead, gold, zinc, arsenic, chromium, uranium, plutonium, and cadmium. Additionally, corona can oxidize radioactive waste, such as radioactive salts including radioactive nitrate.

Earthen material 30 is very dry at this time and acts essentially like a dielectric. This dielectric enables corona to be sustained. The corona causes the formation of a highly chemically reactive plasma. The corona or plasma is at an energy level sufficient to chemically alter the non-volatile contaminants remaining in region 32 of solid earthen material 30.

The efficiency of the plasma reaction depends upon the electron energy released by the corona. The electrons released by in situ corona are an order of magnitude more energetic than those released by convention conductive (metal) electrodes. This is because the in situ corona occurs on nonconductive (dielectric) earthen particles, which require much higher field gradients to cause gas to emit electrons. Field emissions on dielectric (i.e., nonconductive earthen particles) are called autoelectronic emissions, different than what is commonly meant by "corona".

Conventional "corona" formed on metal electrodes in ambient air has an energy less than 20 eV over a very small plasma volume, such as a few micron thick sheath. Contaminants passing through the sheath interact directly with the corona (requires about 5 eV). Additionally, wet air passing through the sheath forms oxidizing radicals that scavenge and react with some of the rest of the contaminant that does not pass through the sheath. Approximately 10 eV is required to produce one OH radical and approximately six OH radicals are required to decompose typical organic contaminants. With these yields, good destruction efficiency only occurs on a very small scale. The conversion of contaminates to unharmful $CO/CO_2$ can be as low as a few percent.

Autoelectronic emissions on dielectric particles (such as earthen particles) emit electrons at energies of several eV. As a result, a very energetic plasma with good oxidant yields is formed (for example, 20–30 OH radicals per electron). Further, more oxidants per coulomb of electricity are produced. The excess of oxidants causes a nearly 100% mineralization of contaminants. Direct destruction of contaminants by electron bombardment is also enhanced, and the plasma volume can directly contact contaminants in much larger (a 100 to 1000 micron sheath). In solid earthen material, the ionized sheath extends farther than interparticle dimensions.

The formation of dry regions 102–107 and the formation of corona at boundaries 110–115 occurs approximately simultaneously. Dry regions 102–107 begin at respective electrodes 20–25 and then move radially outward relative to individual electrodes as the voltages are increased. The corona is carried by wet-dry interfaces or boundaries 110–115. Material exterior to dry regions 102–107 still contains some moisture content which conducts electricity through region 32 which is still exterior to dry regions 102–107. For example, the moisture content within dry regions 102–107 may be 0.5 wt % and the moisture content in "wet" regions exterior to the dry regions may be 4–7 wt %. Therefore, heating and drying continues throughout region 32.

Dry regions 102–107 expand radially outward from respective electrodes 20–25 at a relatively slow rate. The slow movement is caused by the moisture content gradient across boundaries 110–115. The relatively higher moisture content outside dry regions 102–107 impedes expansion of the dry regions. The slow expansion is very advantageous. The slow growth of dry regions 102–107 enables the corona boundaries 110–115 to move slowly through non-volatile contaminates and sorbed or otherwise bounded contaminates. As a result, the corona has sufficient time to decompose the contaminates.

Voltages are increased slowly beyond the second range of voltages to a third range of voltages. The third range of voltages can be extremely high, up to 100 kV. As the voltages are increased slowly through the third ranges of voltages, dry regions 102–107 continue to move radially outward from respective electrodes 20–25. The total power applied to earthen material 30 begins to drop, but the dry regions expand and the corona continues to spread.

Corona boundaries 110–115 encounter non-volatile contaminants and sorbed or otherwise bounded contaminates, referenced generally as 100, as the boundaries move through region 32 (FIG. 7). The corona produces oxidants and reductants that scavenge and react with the remaining contaminants 100. The reaction causes a decomposition of the non-volatilized contaminants 100. Contaminants 100 are often decomposed into volatile fragments which may then be removed through passage 64 of neutral electrode 34 and treated in the off-gas treatment facility.

Eventually, corona boundaries 110–115 pass substantially through region 32 (FIG. 8). As a result, substantially all contaminants within region 32 are removed and/or rendered unharmful. Water, humid air, or steam may then be added to earthen material 30 to restore the earthen material to its natural state.

An advantage of the present invention is that region 32 is substantially uniformly heated due to the arrangement of peripheral electrodes 20–25 and the application of six phases of voltages. The uniform heating is at a temperature which is less than a melting temperature of solid earthen material 30. Solid earthen material 30 is not vitrified during the process. As a result, substantially lower voltages may be used to treat the contaminated material. Additionally, the voltages required to produce the effective heating are further reduced due to the hexagonal arrangement of electrodes 20–25 which permits the formation of parallel resistances. The reduction in voltages results in a significant reduction in equipment and process costs. Further, a reduction in voltages improves safety.

The drying process removes most volatile and semi-volatile contaminants. The present invention includes formation of a corona front which decomposes an nonvolatilized contaminants which remain after the drying process.

Figure 11:
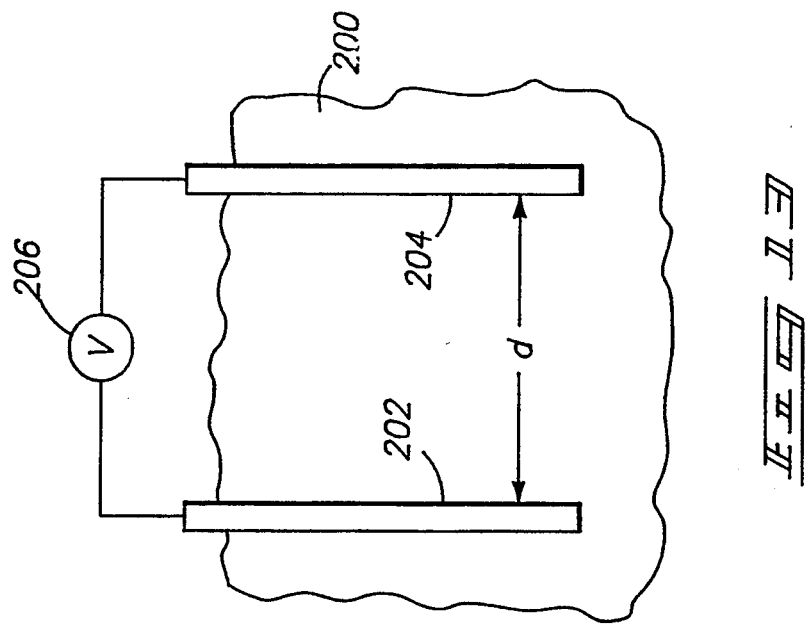
FIG. 11 is a diagrammatical illustration of a system for treating solid earthen material in accordance with another aspect of the present invention.

FIG. 11 is a diagrammatical illustration showing a system 300 for treating earthen material in accordance with the another aspect of the present invention. Six electrodes are inserted into region 32 of solid earthen material 30 to be treated preferably in a hexagonal arrangement described above with reference to FIG. 1. Only four peripheral electrodes 301, 302, 303, and 304 are shown in this view. Neutral electrode 306 is positioned at an approximately diametric center. Peripheral electrodes 301–304 and neutral electrode 306 are inserted into solid earthen material 30 in a substantially parallel relation. Electrodes 301–304 and 306 are inserted to a depth sufficient to ensure that most contaminants 46 lie within region 32 and above distal ends of electrodes 301–304 and 306, as represented by distal ends 308, 310, and 312. Preferably, peripheral electrodes 301–304 and neutral electrode 306 are substantially cylindrical.

Peripheral electrodes 301–304 and neutral electrode 306 each a passage extending axially therethrough which communicates with solid earthen material 30 and a location exterior to solid earthen material 30. For example, peripheral electrodes 301 and 304 have respective passages 314 and 320. Neutral electrode 306 has a passage 324. Peripheral electrodes 301–304 and neutral electrode 306 are perforated to permit fluid communication between earthen material 30 and the passages within the electrodes. Peripheral electrodes 301 and 304 are perforated with multiple through-holes or apertures 318 and 322 permit fluid communication between solid earthen material 30 and respective passages 314 and 320. Similarly, neutral electrode 306 is perforated with multiple apertures 326.

System 300 includes a six phase AC generator 330 coupled to peripheral electrodes 301–304. Six conductors 332 electrically connect generator 330 to respective peripheral electrodes 301–304 (and the two electrodes not shown). A different phase of voltage is applied to individual conductors 332 in a manner described above with reference to FIG. 3. The voltages are sufficient to effectuate drying and the creation of corona.

An off-gas treatment facility 334 is connected in fluid communication to neutral electrode 306 through a conduit 336. Off-gas treatment facility 334 is preferably equipped with a vacuum apparatus to draw contaminated gases from solid earthen material 30 through neutral electrode 306 and conduit 336.

System 300 has a pump unit 340 coupled in fluid communication to peripheral electrodes 301–304 through conduit 342. Conduit 342 is connected to peripheral electrodes 301–304 (and the two electrodes not shown). Conduit 342 may be a single conduit with branches going to individual peripheral electrodes, or may be six distinct conduits coupled to corresponding ones of the peripheral electrodes.

A gas supply 344 is coupled in fluid communication to pump unit 340 through conduit 346. Gas supply 344 stores and supplies gases, such as air, oxygen, hydrogen, and free electron gases (such as noble gases and molecular nitrogen).

System 300 is different from the embodiment depicted in FIG. 3 in that gases may be injected into solid earthen material 30 to help control the reaction occurring in region 32. A desired gas is supplied by gas supply 344 through conduit 346 into pump unit 340. Pump unit 340 pumps the gas through conduit 342 into peripheral electrodes 301–304. The gas flows through the passages (i.e., 314 and 320) of peripheral electrodes and is forced out through the apertures (i.e., 318 and 322), as shown diagrammatically with arrows. The gases are then pulled through region 32 to neutral electrode 306. The vacuum provided in off-gas treatment facility 334 provides sufficient suction to pull the gases through region 32. The gases are drawn through apertures 326 into passage 324 of neutral electrode 306, as shown with arrows. The gases are then removed through conduit 336 to off-gas treatment facility 334.

Any number of gases may be injected into solid earthen material 30. Oxygen may be injected into region 32 to increase the oxygen content of the region. The excess oxygen helps optimize the rate of reaction as the corona boundary sweeps through region 32. Hydrogen may be added to facilitate chemical reduction. Chemical reduction is often desired to decompose highly chlorinated contaminants, such as carbon tetrachloride ($CCl_4$).

Free-electron gases (such as noble gases and molecular nitrogen) may be injected into region 32 to help reduce the voltages required to sustain corona discharge. Free-electron gases displace free atoms of oxygen, which are electron attaching. Without the addition of free-electron gases, a higher voltage is required to reduce a stronger field to overcome the tendency of electrons to attach to oxygen. Injecting free-electron gases into region 32 displaces some of the free atoms of oxygen, allowing for a reduction in field strength without diminishing corona. As a result, voltages can be reduced.

FIG. 11 also diagrammatically illustrates an alternative aspect of the present invention. System 300 may be adapted with a vacuum unit 350 provided in a recycle loop consisting of conduits 352 and 354. Conduit 352 would be connected in fluid communication with passage 324 of neutral electrode 306. Vacuum unit 350 would provide sufficient suction to remove contaminated gases from region 32. The contaminated gases would then be returned to region 32 through conduit 354, pump unit 340, conduits 342, and peripheral electrodes 301–304. In this embodiment, off-gas treatment facility 334 is not utilized.

According to this aspect of the present invention, the contaminated gases are recycled through the dry regions and through the corona boundaries discussed above with reference to FIGS. 6–9. The contaminated gases are decomposed when passed through the corona discharge. Accordingly, the off-gas produced while treating earthen material 30 is effectively treated by recycling the off-gas back through region 32 of earthen material 30.

FIG. 12 is a diagrammatic representation of an off-gas treatment apparatus 400 in accordance with another aspect of the present invention. Off-gas treatment apparatus 400 chemically treats contaminated gases, or the like. For example, off-gas treatment apparatus 400 may be used to treat gases such as $NO_x$, or gases produced during in situ vitrification processes, soil vapor extraction operations, or other process exhausts.

Apparatus 400 is preferably dimensioned at a scale to be portable. In this manner, apparatus 400 may be transported to vitrification or extraction sites, or other locations in need of off-gas treatment.

Off-gas treatment apparatus 400 has a container 402 which is preferably formed of a durable plastic or other insulative material. Container 402 has a floor 412 and walls 403, and may be cylindrically shaped or have multiple substantially flat walls. Container 402 is filled with material 404, such as solid earthen material. Preferably, material 404 is sand.

Six peripheral electrodes are inserted into material 404. The peripheral electrodes are preferably arranged at vertices of a substantially equilateral hexagon as shown in FIG. 1. Only four peripheral electrodes 406, 407, 408, and 409 are shown in this illustration. Peripheral electrodes 406–409 are positioned adjacent to and spaced from wall 403 of container 402. A neutral electrode 410 is inserted into a center region of container 402. Peripheral electrodes 406–409 and neutral electrode 410 are inserted to a depth such that distal ends of the electrodes do not contact floor 412 of container 402. Electrodes 406–409 and neutral electrode 410 are substantially hollow and thereby define passages axially therethrough. Electrodes 406, 409, and 410 have respective passages 414, 416, and 418. Peripheral electrodes 406–409 and neutral electrode 410 have through-holes or apertures formed therein to permit fluid communication between passages (414, 416, 418) and material 404.

Off-gas treatment apparatus 400 has a six phase AC generator 420 coupled to peripheral electrodes 406–409. Six phase AC generator 420 generates six phases of voltages and applies the voltages via conductors 422 to corresponding electrodes 406–409 (and the two electrodes not shown). The voltages applied to the peripheral electrodes are sufficient to create and sustain corona within material 404. The formation of corona is discussed above with reference to FIGS. 6–9.

Apparatus 400 also has a fluid removing unit to remove fluid from the material 404. The fluid removing unit preferably includes a vacuum unit 424 coupled in fluid communication via conduit 426 to neutral electrode 410. Vacuum unit 424 applies sufficient suction to draw gases through material 404 into passage 416 of neutral electrode 410. Alternatively, the fluid removing unit may comprise a vacuum attached to an off-gas hood positioned above material 404 in container 402, as described above with reference to FIG. 10.

A recycle unit 430 is connected in fluid communication with vacuum unit 424 through conduit 432. The recycle unit is also connected in fluid communication with peripheral electrodes 406–409 through conduits 434, 435, 436, and 437, respectively. Recycle unit 430 receives the gas to be treated via conduit 440. An outflow conduit 442 is provided to exhaust gas which has been treated and rendered unharmful.

Recycle unit 430 can include a pump for pumping gases through conduits 434–437 to peripheral electrodes 406–409. Recycle unit 430 may further include a heater to heat the gas at a temperature sufficient to maintain a vapor state. The gas is at a vaporized temperature when removed from material 404. It may be desirable to maintain the gases in the vapor form and thus heating is required. Alternately, it may be desirable to condense the vapors. If condensation is desired, recycle unit 430 may be equipped with a heat exchanger to cool the extracted vapors and condense the vapors.

In operation, the gas to be treated flow through conduit 440 to recycle unit 430. Recycle unit 430 directs the gases to be treated through conduits 434–437 to respective peripheral electrodes 406–409. The gas flows through respective passages in the peripheral electrodes and out the apertures (as shown by the arrows). The gases are drawn through material 404 from peripheral electrodes 406–409 to neutral electrode 410 via the suction provided by vacuum unit 424. The gases enter passage 416 of neutral electrode 410 and are removed through conduits 426 and 432 into recycle unit 430. The gases at this time may be very hot (such as 100° C.).

If these gases are permitted to cool, the gases may condense to leave the vapor state. Recycle unit 430 may heat the gases at a temperature sufficient to maintain a vapor state if desired. The recycle unit 430 forces the gases back through conduits 434–437 to peripheral electrodes 406–409 to continue the recycling and treating process.

The gases are chemically treated as they move between peripheral electrodes 406–409 and neutral electrode 410. This is because six phase AC generator 420 supplies six phases of voltages to peripheral electrodes 406–409 (and the two electrodes not shown) effective to produce a corona discharge within material 404. The contaminated gases are chemically altered or decomposed as they pass through the corona discharge. Accordingly, recycling the gases through apparatus 400 decomposes the contaminants and renders them unharmful. When the gases are sufficiently decomposed, recycle unit 430 vents these gases through conduit 442.

In accordance with an aspect of the present invention, off-gas treatment apparatus 400 may be equipped with wet air or steam supply 452. Steam supply 452 stores and supplies wet air or steam to recycle unit 430 via conduit 454. The steam can then be injected into material 404 through peripheral electrodes 406–409. Steam may be added to material 404 to effectuate an approximately constant dry region and an approximately stationary corona boundary. That is, corona will remain relatively close to peripheral electrodes 406–409 and not move radially outward through material 404 as described above with reference to FIGS. 6–9. A move corona front is not as important in this embodiment because not non-volatilized contaminates are buried in material 404. A stationary corona boundary is therefore sufficient to decompose the gases being passed therethrough.

Steam may also be supplied if desired by gas supply 344 in system 300 shown in FIG. 11.

The embodiments described above with respect to FIGS. 11 and 12 were described as having all peripheral electrodes formed with passages. Alternatively, only one or two peripheral electrodes may be provided with passages and conduits for recycling gases back through the region of material. Additionally, another independent electrode may be added to inject gases into the region to be treated. In this manner, gases would be pumped only to this additional electrode and not to the peripheral electrodes.

The conduits described in the present invention may be formed of any material suitable for passing gases. For example, the conduits may be formed of rubber hoses, methyl pipe, or any other tube means.

According to another aspect of the present invention, a method for treating solid earthen material having volatile, semi-volatile, and non-volatile contaminants comprises the steps of:
- inserting multiple electrodes into solid earthen material, the electrodes defining a region of material to be treated;
- applying multiple phases of voltages to corresponding ones of the electrodes;
- adjusting the voltages within a first selected range of voltages to heat the material to a temperature sufficient to substantially remove volatile and semi-volatile contaminates from the region of material;
- creating dry regions of material around individual electrodes as the material is heated, the dry regions having a periphery which defines a boundary between the dry regions of material and earthen material exterior to the dry regions;
- increasing the voltage through a second selected range of voltages effective to form vitrescent earthen material fragments within the dry regions of material;
- moving the boundary of the dry regions radially outward from the individual electrodes through the region of material; and
- decomposing the non-volatile contaminates as the boundary passes over the non-volatile contaminates.

When the voltages are increased through the second range of voltages (i.e., 2000 to 6000 VAC), formation of vitrescent fragments can be formed. The fragments are partially or completely melted, vitrified, sintered or vaporized and recondensed to form a highly branched or dendritic mineral structure (similar to, but more highly branched than fulgurites). The fragments have a dendritic appearance and sometimes have a higher density than the density of the surrounding earthen material. The fragments are often hollow or contain bubbles. The dendritic fragments can be retrievable intact from the earthen material 30.

According to another aspect of the present invention, a method for producing vitrescent soil fragments in a soil region comprises the steps of:
- placing two conductive elements into a soil region, the conductive elements being spaced apart a selected distance;
- applying a voltage across the conductive elements, the voltage being sufficient to form vitrescent soil fragments within the soil region;
- reducing the voltage to a level sufficient to solidify the vitrescent soil fragments; and
- collecting the vitrescent soil fragments after the vitrescent soil fragments have solidified.

FIG. 13 illustrates a method for producing vitrescent soil fragments in accordance with an aspect of the present invention. At least two conductive elements or electrodes 202 and 204 are placed in a soil region 200. Soil 200 is preferably very dry, such as dune sand. The electrodes 202 and 204 are spaced apart a distance "d". A voltage source 206 is coupled to apply a voltage across the electrodes 202 and 204. The voltage applied is sufficient to form vitrescent soil fragments within soil region 200. After formation of the soil fragments, the voltage applied to electrodes 202 and 204 is reduced to a level sufficient to result in solidification of the soil fragments. The resulting soil fragments can have a density higher than the density of the soil 200. The soil fragments may then be collected after the fragments have solidified.

The voltage applied to electrodes 202 and 204 varies considerably. Remarkably, the voltage appears to independent of the distance "d" between electrodes 202 and 204 and the mineral and moisture content of soil 200. When the electrodes are spaced a distance of six to eighteen inches, voltages ranging from 1000 volts to 30,000 volts may be applied to produce the soil fragments.

Voltage source 206 may be a DC or AC power supply. Voltage source 206 may be a pulsed power supply which outputs pulses of voltages. These pulses electrically jolt the soil 200 which can facilitate formation of the soil fragments.

More than two electrodes may be used to form the vitrescent soil fragments. In accordance with another aspect of the present invention, six electrodes may be inserted into soil 200 in an arrangement shown in FIG. 1. Six phases of voltages may then be applied to corresponding electrodes at a level effective to form vitrescent soil fragments within soil 200. The voltages may then be reduced so that the fragments can solidify and be collected.

According to another aspect of the present invention, a method for measuring resistivity and moisture content of solid earthen material comprises the steps of:
- inserting six electrodes into a region of solid earthen material;
- applying six phases of voltages to corresponding ones of the electrodes to create current paths between pairs of the electrodes;
- adjusting the voltages to a level sufficient to form an electric field within the region of material without substantially altering resistivity and moisture content of the region;
- monitoring the voltages;
- monitoring the current passing between the pairs of the electrodes; and
- computing resistivity and moisture content of the material based upon the current and the voltages monitored.

Accurate measurements of moisture content and resistivity of soils or other earth materials are important for many reasons. Farmers are interested in moisture content of their soil. Geologists and geophysicists are interested in the resistivity of soil to help characterize the subterrain geological formations. Characterizing subterrain formations are important for science and for commercial activities such as oil exploration. Accurate soil resistivity measurements are also important for power engineers when attempting to ground power lines.

Present techniques for measuring resistivity and moisture content include placing two to four electrodes into the soil approximately 50-100 feet apart. Voltage is then applied across the electrodes. The current and voltage are monitored to determine moisture content and resistivity. Unfortunately, current does not usually flow directly among the electrodes. Current tends to flow towards the mantel of the earth. Accordingly, the current may flow from one electrode toward the earth mantel and then back towards the other electrode. Current also tends to flow along a underground bodies of water or any other path of least resistance. The current may therefore flow in a direction tangential to the path directly between the electrodes. The longer current path results in an inaccurate resistivity and moisture content measurements.

Another problem with present techniques is that measurements as a function of depth are uncertain. The electrodes are typically inserted to a predetermined depth, such as 8-10 feet, for each and every measurement in an attempt to standardize measurements.

An approach to solving this problem is to position the electrodes closer together. However, this procedure has a drawback in that only one type of soil may be measured. Placing the electrodes farther apart is desirable because current must pass through many different types of soil. A more accurate measurement can therefore be obtained through this increased distance.

According to the present invention, six electrodes may be inserted into a solid earthen material region in a hexagonal arrangement shown in FIG. 1. Six phases of voltages are applied to the corresponding electrodes to create current paths between pairs of electrodes. The voltages applied to the electrodes are very low. The voltages are sufficient, however, to form an electric field within the region of solid earthen material to be measured. The electric field is at a sufficiently low energy level which does not substantially alter resistivity and moisture content of the region. The voltage and current are then monitored using known amperage and voltage meters. From this, resistivity and moisture content can be computed manually or with specially designed circuitry.

An advantage of employing six electrodes arranged in a substantially equilateral hexagon is that the electric field is substantially constrained within the hexagon. The shape of the electric field is thus readily discernable. Therefore, accurate measurements of resistivity and moisture content may be obtained as a function of depth. Conventional techniques are unable to compute accurately resistivity and moisture content as a function of depth.

Middle electrode 34, although preferably neutral, can have a voltage applied thereto. Applying a voltage to electrode 34 would unbalance the uniform heating of region 32 within peripheral electrodes 20-25. For example, heating may be unbalanced so that a hot region is formed close to middle electrode 34.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A method of treating solid earthen material comprising the steps of:
   inserting a plurality of electrodes into a region of solid earthen material to be treated; and
   applying at least six phases of voltages to corresponding ones of the electrodes to create current paths between pairs of the electrodes and through the region of material.

2. A method according to claim 1 further comprising:
   arranging the plurality of electrodes in a geometric configuration having diametrically opposing pairs of electrodes, the pairs defining opposing first and second electrodes; and
   applying first and second phases of voltages to the respective first and second electrodes of respective pairs of electrodes, the first and second phases of voltages having voltage amplitudes which are substantially equal, the first and second phases being approximately 180° out of phase with respect to one another.

3. A method according to claim 1 further comprising heating the region of material with electric current to a temperature ranging from approximately 0° to 100° C.

4. A method according to claim 1, wherein the step of inserting a plurality of electrodes comprises inserting six electrodes at vertices of a substantially equilateral hexagon, the hexagon defining an internal region of solid earthen material to be treated.

5. A method according to claim 4, further comprising inserting a neutral electrode into the internal region to create additional current paths between the six electrodes and the neutral electrode.

6. A method according to claim 5 further comprising positioning the at least six electrodes in the solid earthen material and applying the six phases of voltages in a manner effective to produce a substantially constant voltage-to-distance ratio for all current paths between electrode pairs, the voltage-to-distance ratio for a given pair electrodes being computed by dividing the voltage measured between the given pair of electrodes by the distance between the given pair of electrodes.

7. A method according to claim 1 wherein the step of inserting a plurality of electrodes comprises inserting six electrodes at vertices of a substantially equilateral hexagon to define pairs of first and second diametrically opposed electrodes; and
   wherein the step of applying at least six phases of voltages comprises applying first and second phases of voltages to the respective first and second electrodes of respective pairs of electrodes, the first and second phases of voltages having voltage amplitudes which are substantially equal, the first and second phases being approximately 180° out of phase with respect to one another.

8. A method according to claim 1 wherein at least one of the electrodes has a passage formed therethrough which communicates with the solid earthen material and a location external to the solid earthen material; and
   the method further comprises adding a fluid to the region of material through the passage.

9. A method of treating solid earthen material comprising the steps of:
   inserting a plurality of electrodes into a region of solid earthen material to be treated;
   applying at least six phases of voltages to corresponding ones of the electrodes to create current paths between pairs of the electrodes and through the region of material; and heating the region of material to a temperature below a melting temperature of the solid earthen material.

10. A method according to claim 9 further comprising heating the region of material with electric current to a temperature ranging from approximately 0° to 100° C.

11. A method according to claim 9 further comprising:

arranging the plurality of electrodes in a geometric configuration having diametrically opposing pairs of electrodes, the pairs defining opposing first and second electrodes; and applying first and second phases of voltages to the respective first and second electrodes of respective pairs of electrodes, the first and second phases of voltages having voltage amplitudes which are substantially equal, the first and second phases being approximately 180° out of phase with respect to one another.

12. A method of treating solid earthen material comprising the steps of:

inserting a plurality of peripheral electrodes into solid earthen material, the peripheral electrodes being arranged in a selected geometric perimeter which defines an internal region of material to be treated;

inserting at least one electrically neutral electrode in the region of material to be treated; and applying multiple phases of voltages to corresponding ones of the peripheral electrodes to create current paths between (1) pairs of the peripheral electrodes, and (2) the peripheral electrodes and the neutral electrode, the current paths passing through and substantially uniformly heating the region of material.

13. A method according to claim 12 wherein the step of applying multiple phases of voltages comprises applying at least six phases of voltages.

14. A method according to claim 12 further comprising arranging the peripheral electrodes at vertices of a substantially equilateral polygon having at least six sides and positioning the neutral electrode in a substantially diametric center of the region of material.

15. A method according to claim 14 wherein the peripheral electrodes number six, and are arranged at vertices of a substantially equilateral hexagon.

16. A method according to claim 14 further comprising positioning the peripheral electrodes in the solid earthen material and applying the multiple phases of voltages in a manner effective to produce a substantially constant voltage-to-distance ratio for all current paths between peripheral electrode pairs and between pairs of the peripheral electrodes and the neutral electrode, the voltage-to-distance ratio for a given pair of electrodes being computed by dividing the voltage measured between the given pair of electrodes by the distance between the given pair of electrodes.

17. A method according to claim 12 wherein the neutral electrode has a passage formed therethrough which communicates with the solid earthen material and a location external to the solid earthen material, the method further comprising removing gases from the region of material through the passage in the neutral electrode.

18. A method according to claim 12 wherein at least one of the peripheral electrodes has a passage formed therethrough which communicates with the solid earthen material and a location external to the solid earthen material; and the method further comprises adding a fluid to the region of material through the passage.

19. A method according to claim 12 further comprising:

arranging the peripheral electrodes at vertices of a substantially equilateral polygon having at least six sides and defining diametric opposing pairs of first and second peripheral electrodes;

positioning the neutral electrode in a substantially diametric center of the region of material; and applying first and second phases of voltages to the first and second peripheral electrodes of respective opposing pairs, the first and second phases of voltages having voltage amplitudes which are substantially equal, the first and second phases being approximately 180° out of phase with respect to one another.

20. A method according to claim 12 further comprising:

arranging six peripheral electrodes substantially at vertices of an equilateral hexagon and defining diametric opposing pairs of first and second peripheral electrodes;

positioning the neutral electrode in a substantially diametric center of the region of material; and applying first and second phases of voltages to the first and second peripheral electrodes of respective opposing pairs, the first and second phases of voltages having voltage amplitudes which are substantially equal, the first and second phases being approximately 180° out of phase with respect to one another.

21. A method according to claim 12 wherein the step of applying multiple phases of voltages comprises applying at least six phases of voltages; and wherein the neutral electrode has a passage formed therethrough which communicates with the solid earthen material and a location external to the solid earthen material, the method further comprising removing gases from the region of material through the passage in the neutral electrode.

22. A method for treating solid earthen material comprising the steps of:

(a) inserting first, second, third, fourth, fifth, and sixth electrodes into solid earthen material;

(b) applying a first phase of voltage to the first electrode;

(c) applying a second phase of voltage to the second electrode;

(d) applying a third phase of voltage to the third electrode;

(e) applying a fourth phase of voltage to the fourth electrode;

(f) applying a fifth phase of voltage to the fifth electrode;

(g) applying a sixth phase of voltage to the sixth electrode;

(h) the voltages applied to the first, second, third, fourth, fifth, and sixth electrodes being sufficient to create current paths between pairs of the electrodes through the material, the current paths heating the material; wherein (i) the first, second, third, fourth, fifth, and sixth electrodes are arranged in sequential order in a hexagonal geometric configuration in which the first and fourth electrodes, the second and fifth electrodes, and the third and sixth electrodes are positioned in diametrically opposing relation; and (j) wherein the first and fourth phases are approximately 180° apart, the second and fifth phases are approximately 180° apart, and the third and sixth phases are approximately 180° apart.

23. A method according to claim 22 further comprising applying the first, second, third, fourth, fifth, and sixth phases of voltages at power frequencies.

24. A method according to claim 22 further comprising arranging the first, second, third, fourth, fifth, and sixth electrodes at vertices of a substantially equilateral hexagon.

25. A method according to claim 22 wherein at least one of the first, second, third, fourth, fifth, and sixth electrodes has a passage formed therethrough which communicates with the solid earthen material and a location external to the solid earthen material; and the method further comprises adding a fluid to the region of material through the passage.

26. A method for treating solid earthen material having volatile, semi-volatile, and non-volatile contaminates, the method comprising the steps of:

inserting multiple electrodes into solid earthen material, the electrodes defining a region of material to be treated;

applying multiple phases of voltages to corresponding ones of the electrodes;

adjusting the voltages within a first selected range of voltages to heat the material to a temperature sufficient to substantially remove volatile and semi-volatile contaminates from the region of material;

creating dry regions of material around individual electrodes as the material is heated, the dry regions having a periphery which defines a boundary between the dry regions of material and earthen material exterior to the dry regions;

increasing the voltages to a second selected range of voltages to create a corona at the boundary between the dry regions of material and earthen material exterior to the dry regions;

moving the boundary of the dry regions radially outward from the individual electrodes through the region of material, the corona being moved with the boundary of the dry regions; and decomposing the non-volatile contaminates as the corona carrying boundary passes over the non-volatile contaminates.

27. A method according to claim 26 wherein the first selected range of voltages is less than the second selected range of voltages.

28. A method according to claim 27 wherein the step of moving the boundary comprises increasing the voltages to a third selected range of voltages which is greater than the second selected range of voltages.

29. A method according to claim 26 wherein the step of applying multiple phases of voltages comprises applying at least six phases of voltages, the method further comprising arranging the electrodes at vertices of a substantially equilateral polygon having at least six sides.

30. A method according to claim 29 wherein six electrodes are arranged substantially at vertices of an equilateral hexagon.

31. A method according to claim 26 wherein the temperature is less than a melting temperature of the solid earthen material.

32. A method according to claim 26 further comprising:

inserting an electrically neutral electrode into the solid earthen material, the neutral electrode having a passage formed therethrough which communicates with the solid earthen material and a location external of the solid earthen material; and removing the volatile and semi-volatile contaminates from the solid earthen material through the passage formed in the neutral electrode.

33. A method according to claim 26 wherein at least one of the electrodes has a first passage formed therethrough which communicates with the solid earthen material and a location external to the solid earthen material, the method further comprising:

inserting an electrically neutral electrode into the solid earthen material, the neutral electrode having a second passage formed therethrough which communicates with the solid earthen material and another location external of the solid earthen material;

adding a fluid to the material through the first passage formed in the peripheral electrode;

removing the volatile and semi-volatile contaminates from the solid earthen material through the second passage formed in the neutral electrode.

34. A method according to claim 33 further comprising recycling the contaminates removed from the solid earthen material through the second passage back into the solid earthen material through the first passage.

35. A method for treating solid earthen material having volatile, semi-volatile, and non-volatile contaminates, the method comprising the steps of:

inserting multiple electrodes into solid earthen material, the electrodes defining a region of material to be treated;

applying multiple phases of voltages to corresponding ones of the electrodes;

adjusting the voltages within a first selected range of voltages to heat the material to a temperature sufficient to substantially remove volatile and semi-volatile contaminates from the region of material;

creating dry regions of material around individual electrodes as the material is heated, the dry regions having a periphery which defines a boundary between the dry regions of material and earthen material exterior to the dry regions;

increasing the voltage through a second selected range of voltages effective to form vitrescent earthen material fragments within the dry regions of material;

moving the boundary of the dry regions radially outward from the individual electrodes through the region of material; and decomposing the non-volatile contaminates as the boundary passes over the non-volatile contaminates.

36. A method according to claim 35 wherein the vitrescent material fragments are electrically conductive and facilitate movement of the boundary.

37. A method according to claim 35 wherein the first selected range of voltages is less than the second selected range of voltages.

38. A method according to claim 37 wherein the step of moving the boundary comprises increasing the voltages to a third selected range of voltages which is greater than the second selected range of voltages.

39. A method according to claim 35 wherein the temperature sufficient to substantially remove volatile and non-volatile contaminates is less than a melting temperature of the solid earthen material.

40. A method according to claim 35 wherein the step of applying multiple phases of voltages comprises applying at least six phases of voltages, the method further comprising arranging the electrodes at vertices of a substantially equilateral polygon having at least six sides.

41. A method according to claim 40 wherein the plurality of electrodes number six, and arranging the six electrodes at vertices of a substantially equilateral hexagon.

42. A method according to claim 35 further comprising:
  inserting an electrically neutral electrode into the solid earthen material, the neutral electrode having a passage formed therethrough which communicates with the solid earthen material and a location external of the solid earthen material; and
  removing the volatile and semi-volatile contaminates from the solid earthen material through the passage formed in the neutral electrode.

43. A vitrescent earthen material fragment produced according to the process of claim 35.

44. A method for treating fluids comprising the steps of:
  (a) inserting a plurality of peripheral electrodes into solid earthen material, the peripheral electrodes being arranged at vertices of a substantially equilateral polygon, together with a neutral electrode at approximately a geometric center of the polygon;
  (b) applying at least six phases of voltages to corresponding ones of the peripheral electrodes to create an electric field through the material;
  (c) passing fluid to be treated into the material through the electric field;
  (d) removing fluid from the material;
  (e) recycling the fluid removed from the material back into the material.

45. A method for measuring resistivity and moisture content of solid earthen material comprising the steps of:
  (a) arranging at least six electrodes into a region of solid earthen material in a geometric configuration having diametrically opposing pairs of electrodes, the pairs defining opposing first and second electrodes;
  (b) applying first and second phases of voltages to the respective first and second electrodes of respective pairs of electrodes, the first and second phases of voltages having voltage amplitudes which are substantially equal, the first and second phases being approximately 180° out of phase with respect to one another and creating current paths between pairs of the electrodes;
  (c) adjusting the voltages to a level sufficient to form an electric field within the region of material without substantially altering resistivity and moisture content of the region;
  (d) monitoring the voltages;
  (e) monitoring the current passing between the pairs of the electrodes; and
  (f) computing resistivity and moisture content of the material based upon the current and the voltages monitored.

46. A method according to claim 1, comprising heating the region of material with electric current, substantially uniformly heating the region of material.

47. A method of treating solid earthen material comprising the steps of:
  (a) arranging the plurality of electrodes in a geometric configuration having at least one diametrically opposing pair of electrodes, the pair(s) defining opposing first and second electrodes;
  (b) inserting a plurality of electrodes into a region of solid earthen material to be treated; and
  (c) applying first and second phases of voltages to the respective first and second electrodes of respective pairs of electrodes, the first and second phases of voltages having voltage amplitudes which are substantially equal, the first and second phases being approximately 180° out of phase with respect to one another and creating current paths between the electrodes and through the region of material; and
  (d) heating the region of material to a temperature below a melting temperature of the solid earthen material.

48. A method according to claim 47 further comprising heating the region of material with electric current and substantially uniformly heating the region of material.

49. A method according to claim 47, wherein heating is to a temperature ranging from approximately 0° C. to 100° C.

50. A method according to claim 47, wherein the step of inserting a plurality of electrodes comprises inserting six electrodes at vertices of a substantially equilateral hexagon.

51. A method for treating solid earthen material comprising the steps of:
  (a) inserting first, second, third, fourth, fifth, and sixth peripheral electrodes into solid earthen material, together with a central neutral electrode;
  (b) applying a first phase of voltage to the first electrode;
  (c) applying a second phase of voltage to the second electrode;
  (d) applying a third phase of voltage to the third electrode;
  (e) applying a fourth phase of voltage to the fourth electrode;
  (f) applying a fifth phase of voltage to the fifth electrode;
  (g) applying a sixth phase of voltage to the sixth electrode;
  (h) the voltages applied to the first, second, third, fourth, fifth, and sixth electrodes being sufficient to create current paths between pairs of the electrodes through the material, the current paths heating the material.

52. A method according to claim 51 further comprising applying the first, second, third, fourth, fifth, and sixth phases of voltages at power frequencies.

53. A method according to claim 51 further comprising arranging the first, second, third, fourth, fifth, and sixth electrodes at vertices of a substantially equilateral hexagon.

54. A method according to claim 51, wherein at least one of the first, second, third, fourth, fifth, and sixth electrodes has a passage formed therethrough which communicates with the solid earthen material and a location external to the solid earthen material; and (a) the method further comprises adding a fluid to the region of material through the passage.

55. A method for treating fluids comprising the steps of:
(a) inserting a plurality of peripheral electrodes into solid earthen material, the peripheral electrodes being arranged at vertices of a substantially equilateral polygon and defining at least one diametrically opposed peripheral electrode pair;
(b) applying first and second phases of voltages to the respective first and second electrodes of respective pairs of electrodes, the first and second phases of voltages having voltage amplitudes which are substantially equal, the first and second phases being approximately 180° out of phase with respect to one another and creating an electric field within the solid earthen material;
(c) passing fluid to be treated into the material through the electric field;
(d) removing fluid from the material;
(e) recycling the fluid removed from the material back into the material.

56. A method for measuring resistivity and moisture content of solid earthen material comprising the steps of:
(a) arranging at least six peripheral electrodes in a geometric configuration having diametrically opposing pairs of electrodes, the pairs defining opposing first and second electrodes together with a neutral electrode approximately at a geometric center of the geometric configuration;
(b) applying a plurality of phases of voltages to corresponding peripheral electrodes;
(c) adjusting the voltages to a level sufficient to form an electric field within the region of material without substantially altering resistivity and moisture content of the region;
(d) monitoring the voltages;
(e) monitoring the current passing between the pairs of the electrodes; and
(f) computing resistivity and moisture content of the material based upon the current and the voltages monitored.

* * * * *